(12) United States Patent
Renwart et al.

(10) Patent No.: US 7,297,173 B2
(45) Date of Patent: Nov. 20, 2007

(54) GAS TURBINE AIR INTAKE SYSTEM WITH BYPASS ARRANGEMENT AND METHODS

(75) Inventors: Dominique Renwart, Meldert-Hoegaerden (BE); Michael Handley, Farmington, MN (US); Herman Vanormelingen, Nieuwerkerken (BE)

(73) Assignee: Donaldson Company, Inc., Minneapolis, MN (US)

( * ) Notice: Subject to any disclaimer, the term of this patent is extended or adjusted under 35 U.S.C. 154(b) by 420 days.

(21) Appl. No.: 10/999,540

(22) Filed: Nov. 30, 2004

(65) Prior Publication Data

US 2006/0112825 A1 Jun. 1, 2006

(51) Int. Cl.
*B01D 41/00* (2006.01)
(52) U.S. Cl. .......................... 55/429; 55/428; 55/430; 55/432; 55/466; 95/273; 220/745; 220/810; 220/811; 220/913
(58) Field of Classification Search .................. 55/428, 55/429, 430, 431, 432, 466; 95/273; 60/204, 60/262, 278; 209/244; 220/745, 810, 811, 220/913, DIG. 27; 414/222.01, 287, 288; 52/192, 197
See application file for complete search history.

(56) References Cited

U.S. PATENT DOCUMENTS

| 2,371,785 | A | * | 3/1945 | Tozer ........................... 193/34 |
| 2,502,545 | A | | 4/1950 | Wellborn |
| 2,599,604 | A | | 6/1952 | Bauer et al. |
| 3,076,554 | A | | 2/1963 | Bub |
| 3,243,943 | A | | 4/1966 | Getzin |

(Continued)

FOREIGN PATENT DOCUMENTS

DE 3122213 * 6/1981

(Continued)

OTHER PUBLICATIONS

"The New GDX™ Self-Cleaning Air Filter From Donaldson." Bulletin 3000-31, 4 pgs., no date.

(Continued)

*Primary Examiner*—Duane Smith
*Assistant Examiner*—Sonji Turner
(74) *Attorney, Agent, or Firm*—Merchant & Gould P.C.

(57) ABSTRACT

A hopper arrangement includes a damper arrangement selectively moveable in a plurality of positions to manipulate access to the interior volume. A first position includes a standby position wherein the enclosure and the damper arrangement block access to the interior volume. Another position includes a pressure-relief position wherein the interior volume is open to a continuous airflow path through the container. In some arrangements, there is an evacuation position wherein the damper arrangement allows access to the interior volume and blocks a continuous airflow path through the container. A gas turbine intake system includes a hood, a filter arrangement downstream of the hood and a collection hopper. The collection hopper is in airflow communication with an upstream side of the filter arrangement and downstream of the hood. The collection hopper includes a standby position and a pressure-relief position. A method of filtering air includes drawing air into a hood and then into a filter arrangement. Debris from the filter arrangement is collected in a collection hopper. Further, there is a step of allowing air to bypass the hood and flow to the filter arrangement through a bypass flow passageway selectively opened by the collection hopper.

18 Claims, 14 Drawing Sheets

U.S. PATENT DOCUMENTS

| | | | |
|---|---|---|---|
| 3,511,337 A | 5/1970 | Pease et al. | |
| 3,631,654 A | 1/1972 | Riely et al. | |
| 3,828,524 A | 8/1974 | Booth et al. | |
| 3,853,529 A | 12/1974 | Boothe et al. | |
| 3,950,157 A | 4/1976 | Matney | |
| 3,953,566 A | 4/1976 | Gore | |
| 4,004,566 A | 1/1977 | Giacovas | |
| 4,065,341 A | 12/1977 | Cub | |
| 4,135,900 A | 1/1979 | Westlin et al. | |
| 4,136,804 A * | 1/1979 | Kinzler et al. | 222/547 |
| 4,149,863 A | 4/1979 | Ballard | |
| 4,158,449 A | 6/1979 | Sun et al. | |
| 4,187,390 A | 2/1980 | Gore | |
| 4,204,960 A | 5/1980 | Sugiyama et al. | |
| 4,234,323 A | 11/1980 | Maher | |
| 4,300,918 A | 11/1981 | Cary | |
| 4,395,269 A | 7/1983 | Schuler | |
| 4,443,237 A | 4/1984 | Ulvestad | |
| 4,452,616 A | 6/1984 | Gillingham et al. | |
| 4,504,293 A | 3/1985 | Gillingham et al. | |
| 4,619,675 A | 10/1986 | Watanabe | |
| 4,652,285 A | 3/1987 | Greene | |
| 4,704,143 A | 11/1987 | Percy | |
| 4,758,460 A | 7/1988 | Spicer | |
| 4,767,427 A | 8/1988 | Barabas | |
| 4,769,096 A | 9/1988 | Vander Giessen et al. | |
| 4,878,930 A | 11/1989 | Manniso et al. | |
| 4,945,125 A | 7/1990 | Dillon et al. | |
| 4,969,999 A | 11/1990 | Riddell | |
| 5,026,591 A | 6/1991 | Henn et al. | |
| 5,066,683 A | 11/1991 | Dillon et al. | |
| 5,137,696 A | 8/1992 | Hitachi et al. | |
| 5,157,058 A | 10/1992 | Dillon et al. | |
| 5,229,078 A | 7/1993 | Haerle | |
| 5,266,195 A | 11/1993 | Hopkins | |
| 5,346,675 A | 9/1994 | Usui et al. | |
| 5,350,515 A | 9/1994 | Stark et al. | |
| 5,362,553 A | 11/1994 | Dillon et al. | |
| 5,374,402 A | 12/1994 | Hitachi et al. | |
| 5,397,632 A | 3/1995 | Murphy, Jr. et al. | |
| 5,403,367 A | 4/1995 | DeVilliers et al. | |
| 5,478,372 A | 12/1995 | Stark | |
| 5,562,746 A | 10/1996 | Raether | |
| 5,632,791 A | 5/1997 | Oussoren et al. | |
| 5,635,786 A | 6/1997 | Taylor et al. | |
| 5,750,026 A | 5/1998 | Gadkaree et al. | |
| 5,772,883 A | 6/1998 | Rothman et al. | |
| D396,098 S | 7/1998 | Gillingham et al. | |
| 5,792,247 A | 8/1998 | Gillingham et al. | |
| 5,820,645 A | 10/1998 | Murphy, Jr. | |
| 5,853,439 A | 12/1998 | Gieseke et al. | |
| 5,895,574 A | 4/1999 | Friedmann et al. | |
| 5,961,696 A | 10/1999 | Gombos | |
| 6,123,751 A | 9/2000 | Nelson et al. | |
| 6,348,085 B1 | 2/2002 | Tokar et al. | |
| 6,802,690 B2 | 10/2004 | Han et al. | |
| 7,048,500 B2 * | 5/2006 | Cuvelier et al. | 415/119 |

FOREIGN PATENT DOCUMENTS

| | | | |
|---|---|---|---|
| GB | 2 103 106 | | 2/1983 |
| JP | 52043258 | * | 4/1977 |
| WO | WO 95/05234 | | 2/1995 |

OTHER PUBLICATIONS

"Genuine Duralife™ Filter Cartridges From Donaldson." Bulletin 3000-33, 4 pgs., no date.

"GDX™ Pulse Cleaning Filter System." Donaldson® Gas Turbine Systems Brochure #3000-46, 4 pgs. (Copyright 1996).

"Spider-Web® Filter Media." Donaldson® Gas Turbine Systems Brochure #3000-35, 4 pgs. (Copyright 1994).

* cited by examiner

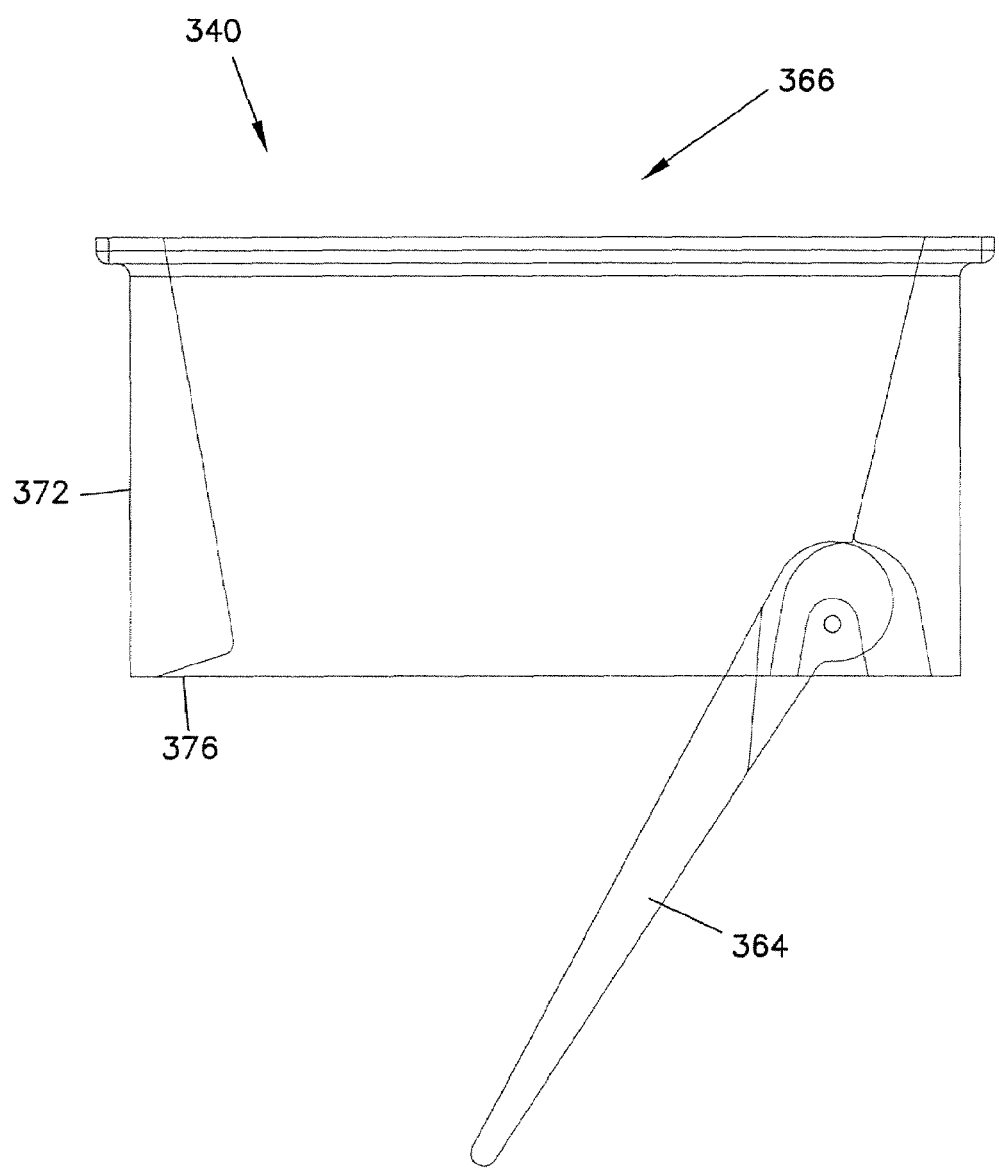

GAS TURBINE AIR INTAKE SYSTEM WITH BYPASS ARRANGEMENT AND METHODS

TECHNICAL FIELD

This disclosure relates to an air intake system for a gas turbine system, including a bypass arrangement and methods of operation.

BACKGROUND

Gas turbine systems are useful in generating electricity. These types of systems are particularly convenient in that they can be constructed quickly; they are also desirable because they produce fewer harmful emissions than coal or oil based turbine systems. Gas turbines utilize air for combustion purposes. Due to the precision moving parts in these types of systems, the combustion air needs to be clean. To ensure clean air for combustion, air filters have been used to clean the air taken into the gas turbine system.

Filters are used to purify the air intake for gas turbines. The filter media used for the purification, over time, will load with contaminant. Filters are used until they are plugged (contaminant blocks all flow through the media) or until a predetermined restriction level is reached. Both are associated with flow and the work necessary to move the flow. Either too little fluid is allowed to flow through, or too much work is required to move the desired flow due to the higher restriction.

In some systems, pulse jet cleaning is used to periodically remove contaminant from the upstream side of the filter media. Using pulse cleaning increases the life of the filter by decreasing the restriction and increasing the service interval. Pulse cleaning has been used with pleated filters in arrangements described in U.S. Pat. Nos. 4,364,751; 4,218,227; 4,331,459; and 5,575,826, each of which is incorporated by reference herein. In addition, pulse-cleaning is used with z-media arranged in V-packs, as described in commonly assigned U.S. patent application Ser. No. 10/731564, filed Dec. 8, 2003, the disclosure of which is incorporated herein by reference. Pulse cleaning removes at least some of the dust and contaminant from the upstream side of the filters. The dust and debris are allowed to fall by gravity down into collection hoppers.

SUMMARY OF THE DISCLOSURE

A hopper arrangement is provided including a container. The container includes an enclosure and a damper arrangement. The container defines an interior volume. The damper arrangement is selectively moveable in a plurality of positions to manipulate access to the interior volume. A first position includes a standby position wherein the enclosure and the damper arrangement block access to the interior volume. In preferred embodiments, another position includes a pressure-relief position wherein the interior volume is open to a continuous airflow path through the container. In some embodiments, there is a further position including an evacuation position wherein the damper arrangement allows access to the interior volume and blocks a continuous airflow path through the container.

A gas turbine intake system is provided including a hood, a filter arrangement downstream of the hood and constructed and arranged to purify air upstream from a gas turbine, and a collection hopper. The collection hopper is in airflow communication with an upstream side of the filter arrangement and downstream of the hood. The collection hopper is positioned to collect debris caught by the filter arrangement. The collection hopper includes at least a standby position and a pressure-relief position. The standby position includes the collection hopper forming a closed interior volume. The pressure-relief position includes the collection hopper forming an open airflow passageway to allow a continuous stream of airflow through the collection hopper and to the filter arrangement.

A method of filtering air for a gas turbine system is provided. The method includes drawing air into a hood and then into a filter arrangement. Next, there is a step of collecting debris from the filter arrangement into a collection hopper oriented below the filter arrangement. Further, there is a step of allowing air to bypass the hood and flow to the filter arrangement through a bypass flow passageway selectively opened by the collection hopper.

BRIEF DESCRIPTION OF THE DRAWINGS

FIG. 15 is a schematic, side elevational view of another embodiment of a collection hopper, and showing the collection hopper in a pressure-relief position.

DETAILED DESCRIPTION

A. Overview of System

Figure 1:
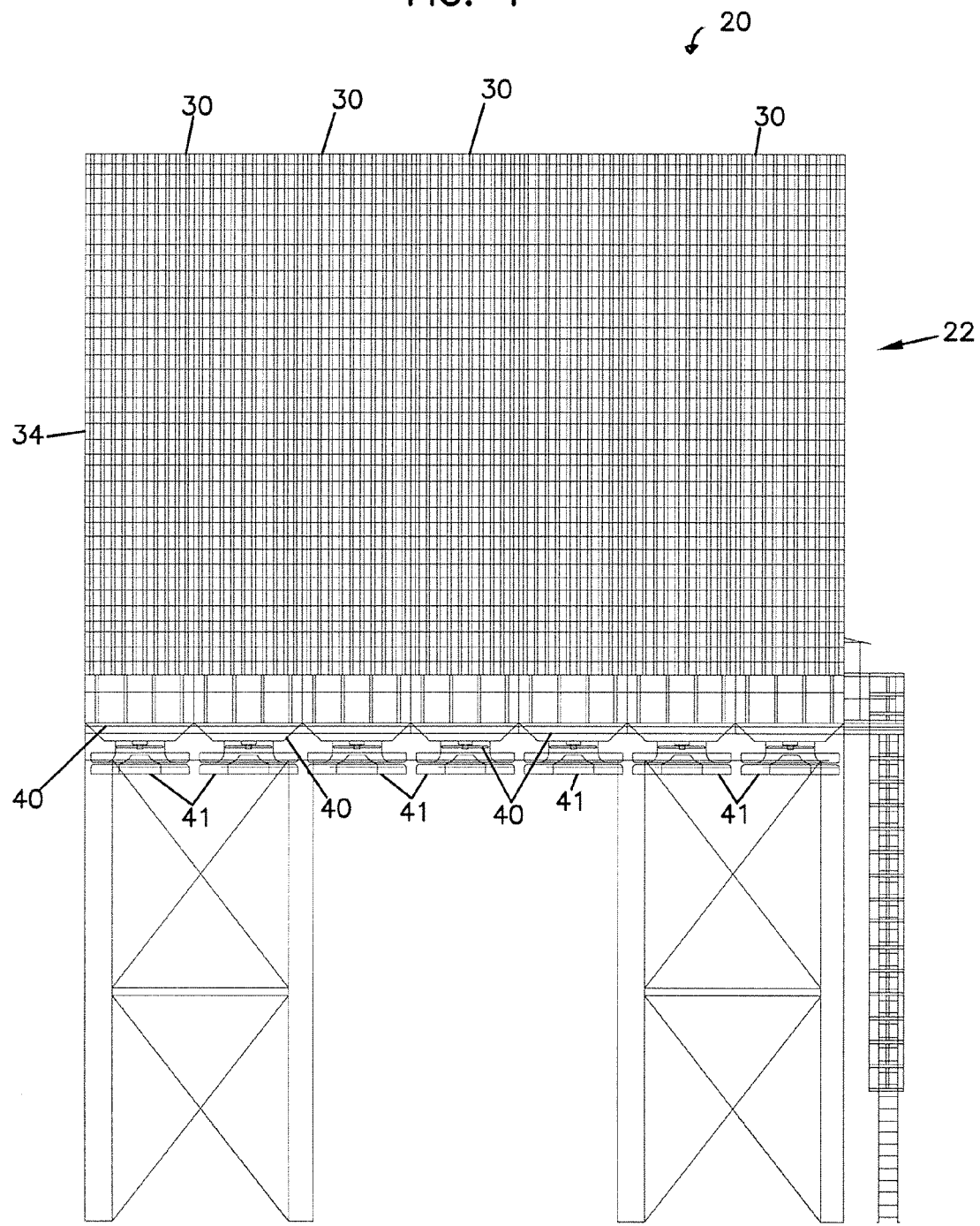
FIG. 1 is a schematic, front elevational view of a gas turbine air intake system constructed according to principles of this disclosure.
Figure 3:
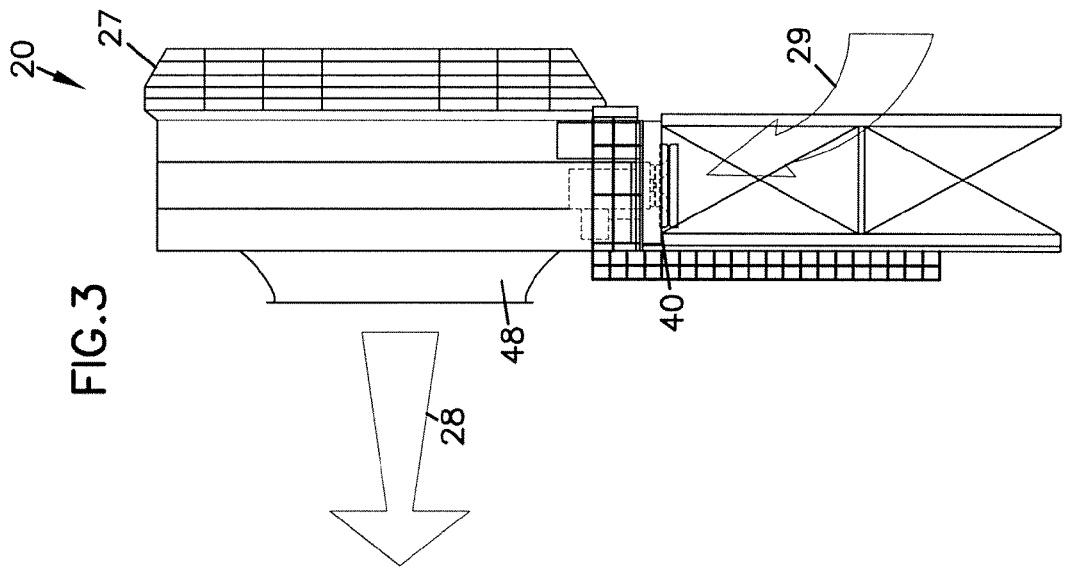
FIG. 3 is a schematic, side elevational view of the system of FIGS. 1 and 2 but showing the system during bypass operation.
Figure 2:
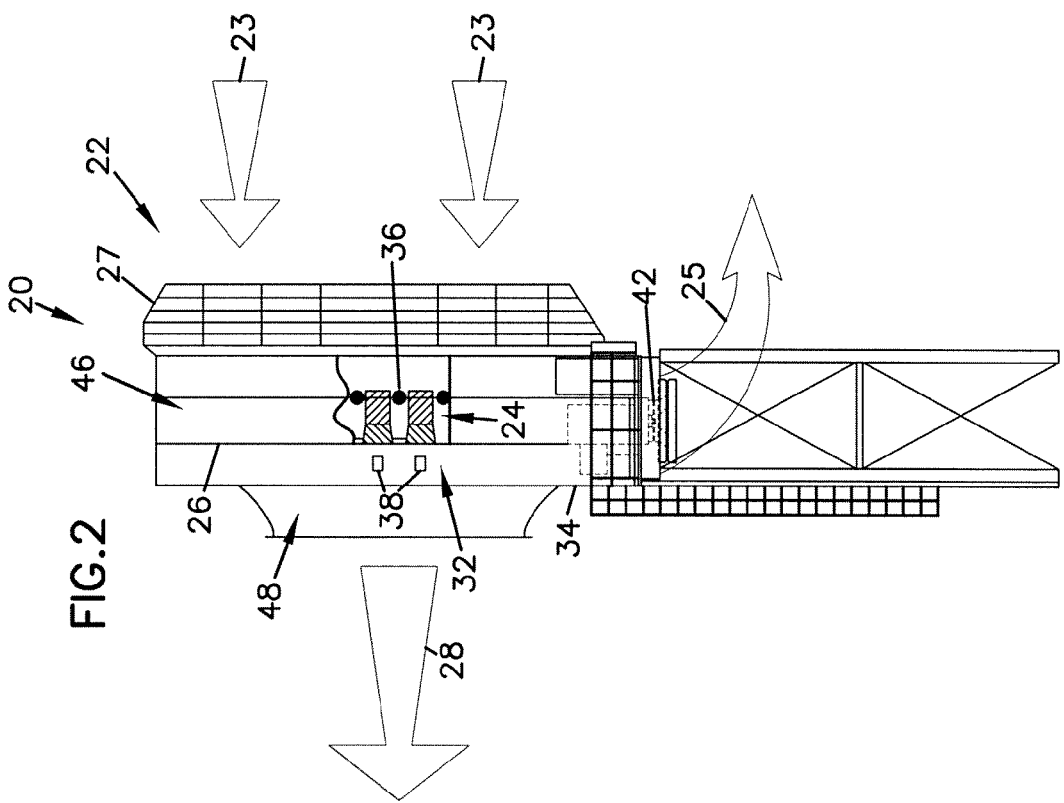
FIG. 2 is a schematic, side elevational view of the system depicted in FIG. 1 and shown during normal operation.

The methods of use, arrangements, and constructions disclosed herein are usable with a variety of systems. FIGS. 1-3 depict one example system. In this case, the example system shown is a gas turbine system. The gas turbine system is shown schematically in FIGS. 1-3 at reference numeral 20.

In FIG. 2, gas, such as air, is shown drawn into an air intake system 22 at arrows 23. The air intake system 22 includes a hood 27 and a plurality of gas filter elements 24. The plurality of gas filter elements 24 are held within a tube sheet 26. The tube sheet 26 divides system 22 into a dirty air plenum 46, upstream of the tube sheet 26, and a clean air plenum 48, downstream of the tube sheet 26. The air is cleaned with the filter elements 24. The hood 27 can be a moisture separator, a noise muffler, a large debris catcher, and a combination of each of these. After cleaning, the air flows downstream at arrows 28 and into a gas turbine generator, where it is used to generate power. It should be understood that in FIGS. 1-3, only a portion of the air intake system 22 is depicted. This is for purposes of clarity and explanation.

FIG. 1 shows a front elevational view of the air intake 22. Several filter elements 24 (FIG. 2) are used and arranged in columns 30. After a period of use, the pressure drop across the filter elements 24 will increase due to the collection of impurities. The filter elements 24 are periodically cleaned by directing a flow of higher pressure fluid (such as a pulse of compressed gas) into the filter elements 24 in a direction from the downstream side of the filter element to the upstream side of the filter element 24. This will remove at least some of the contaminant and particulate matter from the filter element 24 and reduce the restriction across the filter elements 24. Referring again to FIG. 2, a reverse-pulse cleaning system 32 is provided in the air intake system 22. The reverse-pulse cleaning system 32 is mounted on the frame 34 of the air intake system 22. The reverse-pulse cleaning system 32 typically includes a manifold 36 in communication with a nozzle arrangement 38. The compressed air is directed by the manifold 36 into the nozzles 38. The nozzles 38 direct the compressed air into individual filter elements 24 on their downstream sides. Dirt and debris is knocked loose from the upstream side of the filter elements 24, where it falls by gravity to a hopper arrangement 40 (also referred to herein as "collection hopper 40"). In the embodiment of FIG. 1, it can be seen that the hopper arrangement 40 includes one hopper 41 for each column 30. In other embodiments, the hopper arrangement can be configured to correspond to two or more columns.

FIG. 2 depicts the gas turbine system 20 in normal operation. "Normal operation" is defined as the air flowing at arrows 23 into the dirty air plenum 46, through the filter elements 24, and into the clean air plenum 48. Dirty air is exhausted through the hopper 40 at arrow 25.

FIG. 3 shows a bypass condition of the gas turbine system 20. In FIG. 3, the air intake 22 is clogged for some reason, such as icing. In this condition, the combustion air is allowed to partially or completely bypass the hood 27. In this arrangement, the intake air is directed through a path 29 through the hopper arrangement 40. From there, the intake air is directed through the filter elements 24 and into the clean air plenum 48.

B. An Example Pressure-Relief System

As mentioned above, in certain conditions, the air intake 22 will be clogged for various reasons. This could be due to freezing rain, snow, an abundant amount of dirt, etc., clogging the intake system, particularly the hood 27. In such a condition, it is still important to allow air to reach the filters 24 for a cleaning before being directed to the gas turbine. The gas turbine system 20 is particularly well suited to handle these types of conditions.

In general, a method and system is provided for filtering air for the gas turbine system 20. The method and apparatus includes drawing air into the hood 27 and then into the filter arrangement 24. Next, debris, dirt, etc. is separated from the air by the filter arrangement 24. The debris, dirt, etc. is collected from the filter arrangement 24 into the collection hopper 40. As can be seen in FIGS. 1-3, the collection hopper 40 is oriented below the filter arrangement 24. This allows the dirt and debris to fall by gravity from the filter elements 24 into the collection hopper 40. For example, when the reverse pulse cleaning system 32 operates, dirt and debris is knocked loose from the upstream side of the filter elements 24, and it falls by gravity into the collection hopper 40. If restriction across the filter elements 24 reaches a predetermined level, or if the operator is concerned that the intake system is going to become blocked or restricted, the bypass or pressure-relief system is actuated. This allows air to bypass the hood 27 and flow to the filter elements 24 through a bypass flow passageway selectively opened by the collection hopper 40. Example apparatus and systems to accomplish this method are discussed below.

Figure 4:
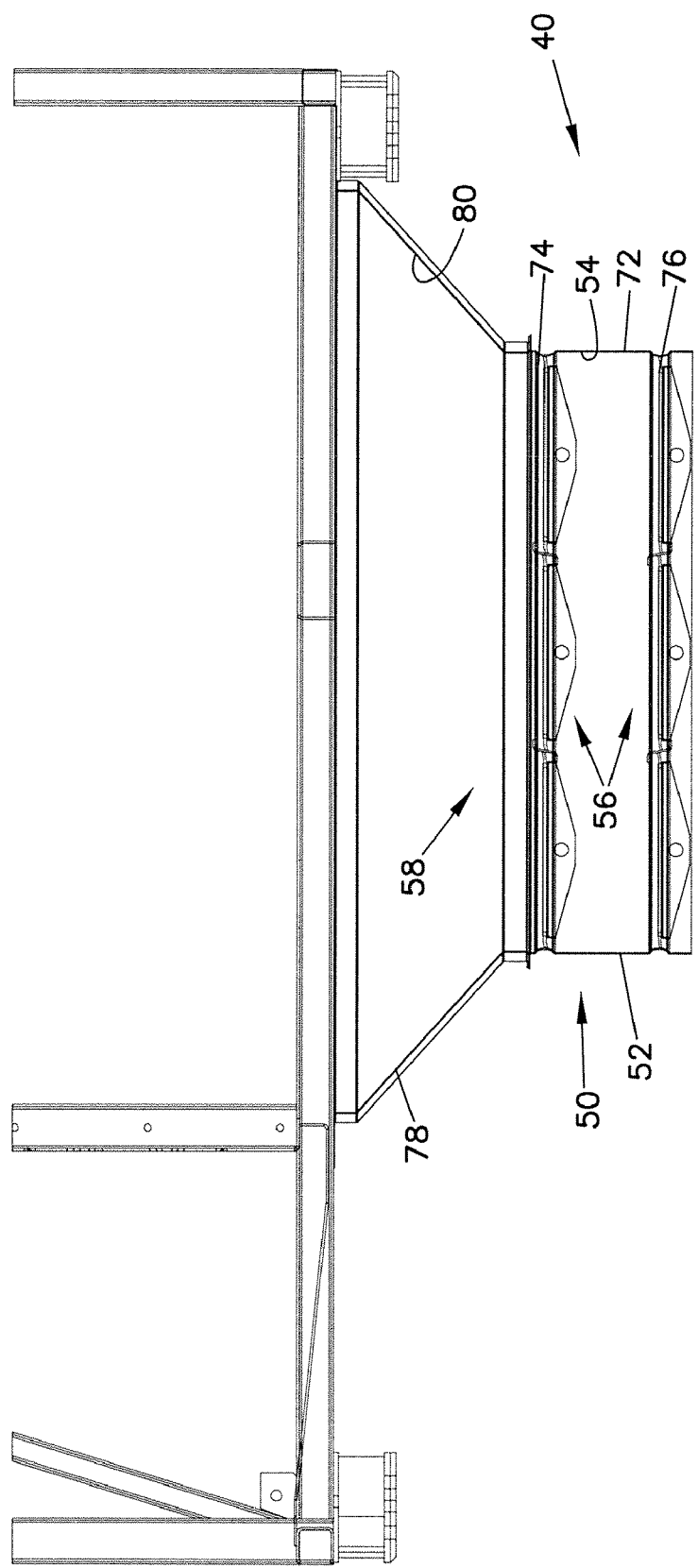
FIG. 4 is a schematic, enlarged, front elevational view of a portion of the gas turbine air intake system depicted in FIG. 1, showing an enlarged view of the collection hopper.

Referring to first to FIGS. 4-7, a first example of hopper arrangement 40 is illustrated schematically, in front elevational view. The hopper arrangement illustrated in FIGS. 4-7 includes a container 50. The container 50 includes an enclosure 52 defining an interior volume 54. The enclosure 52 has, preferably, a damper arrangement 56. The damper arrangement, as can be seen in FIGS. 4-7, is selectively moveable in a plurality of positions to manipulate access to the interior volume 54. In this example, the damper arrangement 56 is selectively moveable in at least three positions. FIG. 4 illustrates a standby position 58. The standby position 58, shown in FIG. 4, is a position of the hopper arrangement 40 in which the enclosure 52 and damper arrangement 56 block access to the interior volume 54. In FIG. 4, it can be seen how the interior volume 54 is closed to airflow therethrough.

Figure 5:
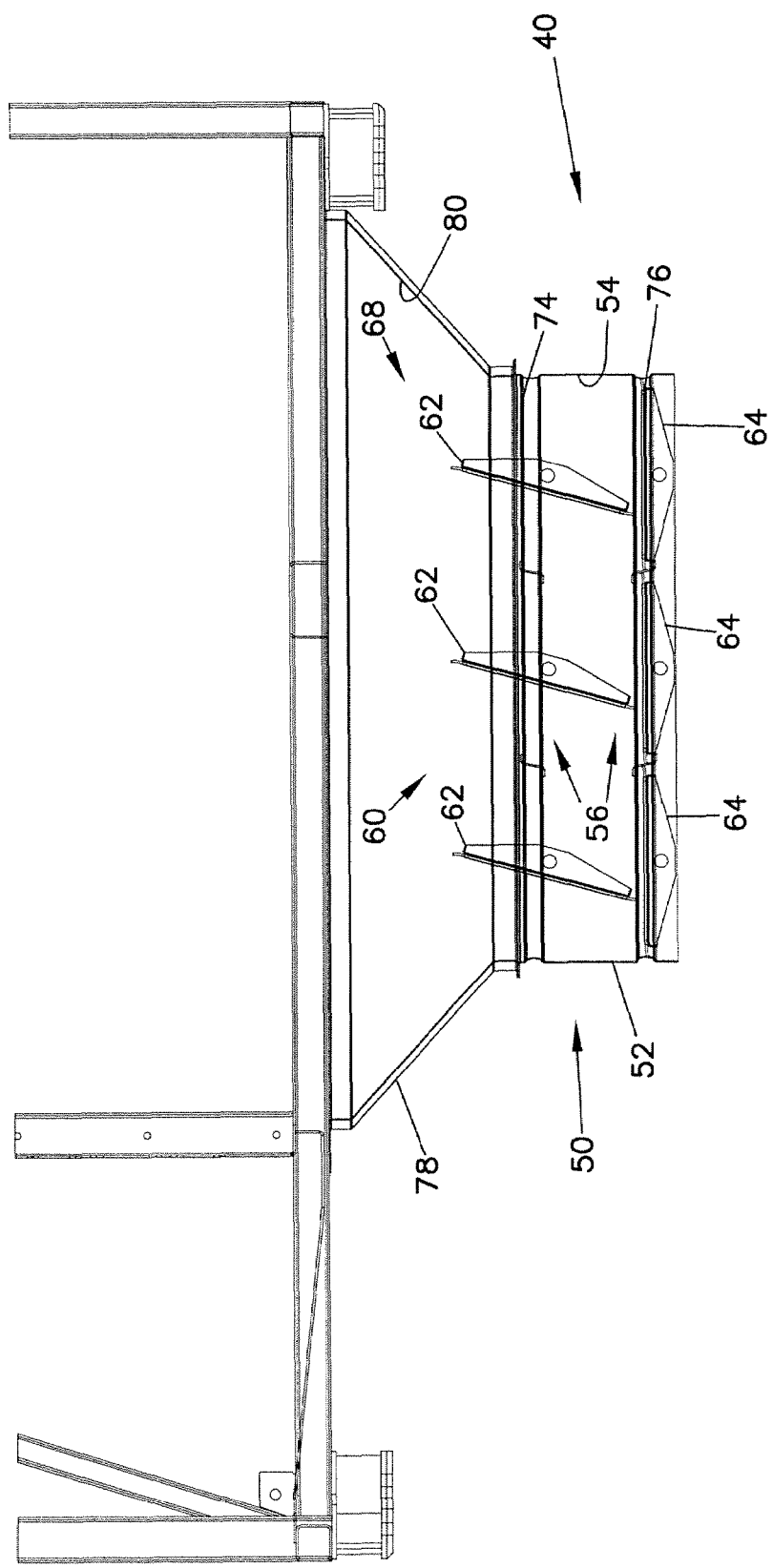
FIG. 5 is the same view as FIG. 4, and depicting the collection hopper in an evacuation position.
Figure 6:
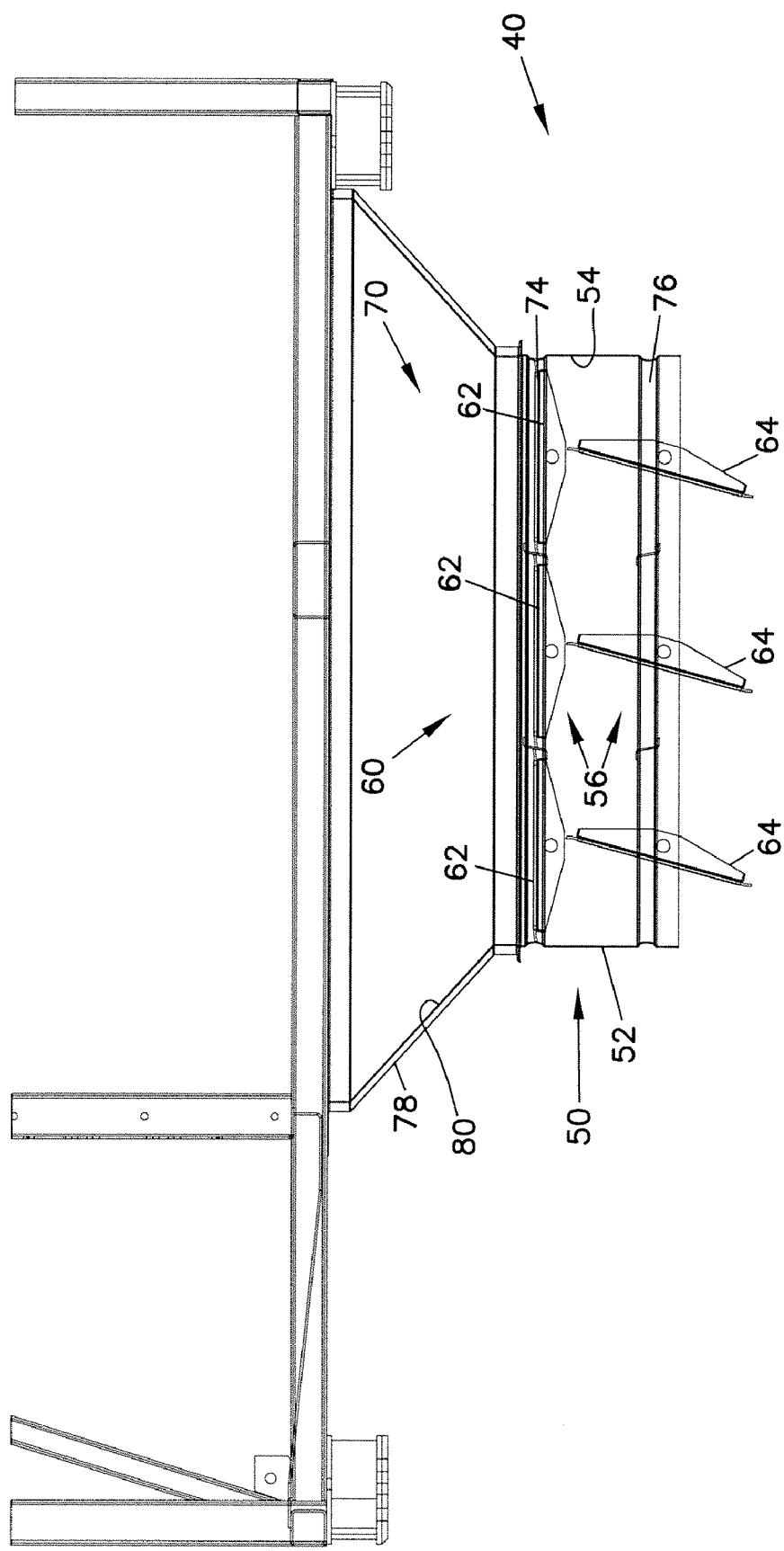
FIG. 6 is the same view as FIGS. 4 and 5, and depicting the collection hopper in a second evacuation position.

FIGS. 5 and 6 illustrate examples of the hopper arrangement 40 in an evacuation position 60. The evacuation position is one in which the damper arrangement 56 allows access to the interior volume 54 while still blocking a continuous flow of air through the container 50. In the particular example illustrated in FIGS. 5 and 6, the evacuation position 60 blocks a straight-line airflow through the container 50. FIG. 5, for example, shows a plurality of top dampers 62 pivoted relative to other portions of the container 50 to allow access to the interior volume 54, while bottom dampers 64 continue to block access to the interior volume 54. In use, dust and debris falls from the filter elements 24 into the collection hopper 40 and rest on top of the top dampers 62. During part one of the evacuation position 60, the top dampers 62 are pivoted and empty the dust and debris from the top dampers 62 into the interior volume 54 to rest on the bottom dampers 64.

FIG. 6 illustrates part two of the evacuation position 60. In FIG. 6, the top dampers 62 are blocking access to the interior volume 54, while the bottom dampers 64 are pivoted relative to a remaining portion of the container 50. In practice, the dust and debris is emptied from the interior volume 54 by sliding along the bottom dampers 64 and falling by gravity to the ground or other disposal site below the collection hopper 40.

Figure 7:
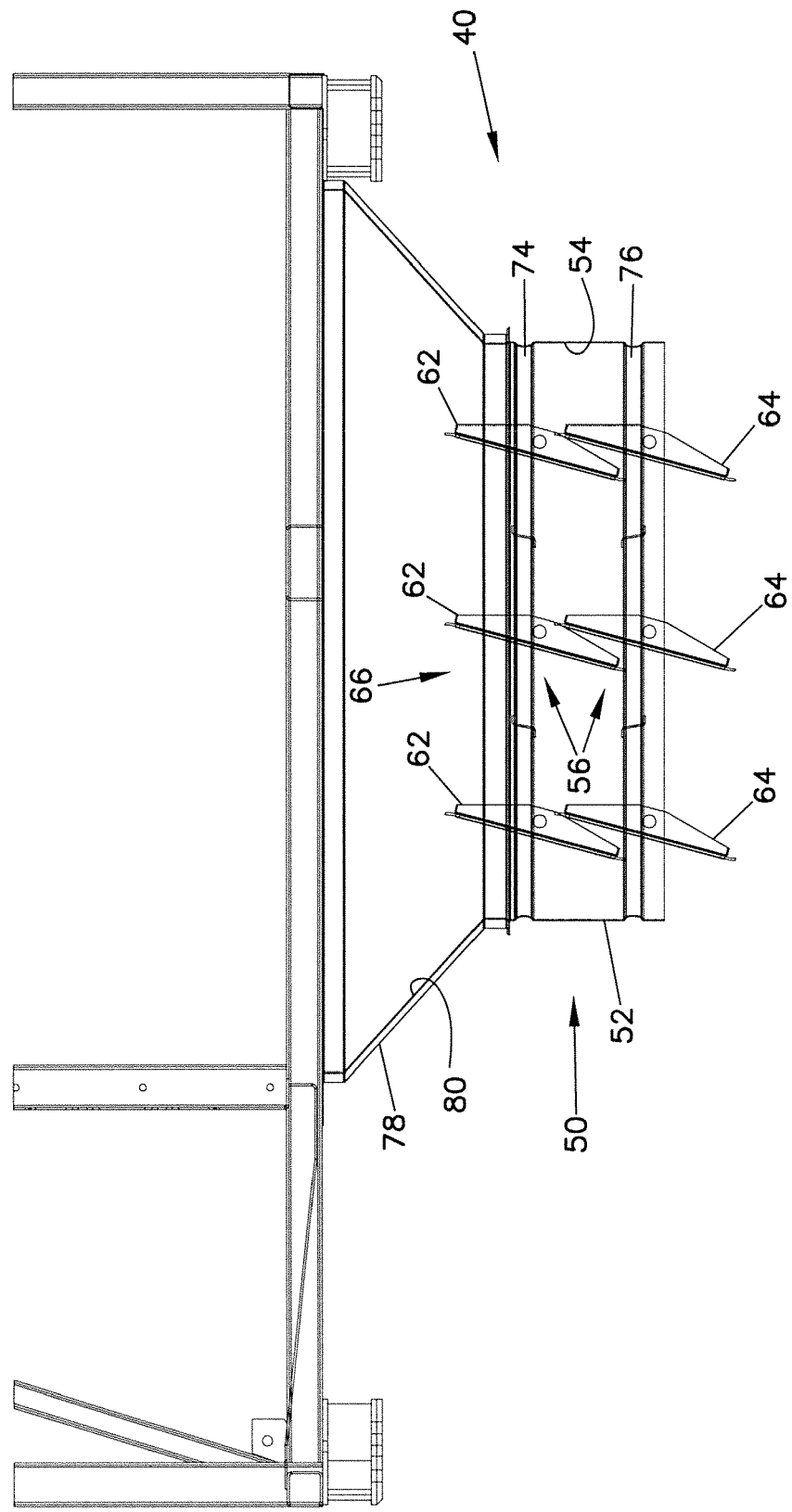
FIG. 7 is a view of the collection hopper depicted in FIGS. 4-6, and showing the collection hopper in a pressure-relief position.

FIG. 7 illustrates a pressure-relief position 66. As can be seen in FIG. 7, the pressure-relief position 66 opens the interior volume 54 to a continuous stream of airflow through the hopper arrangement 40. In practice, the airflow is allowed to flow through the hopper arrangement 40 and up into the dirty air plenum 46 to the upstream side of the filter elements 24. From there, the air is purified or filtered, and is then allowed to flow to the turbine. In the particular arrangement shown in FIG. 7, the pressure-relief position 66 allows a straight-line airflow through the container 50. In FIG. 7, it can be seen how both the top dampers 62 and bottom dampers 64 are pivoted relative to a remaining portion of the container 50, such that both the top dampers 62 and bottom dampers 64 allow airflow access to the interior volume 54.

By comparing FIGS. 5 and 6, it should be apparent that the evacuation position 60 includes at least a first evacuation position 68 and a second evacuation position 70. The first evacuation position 68 includes the damper arrangement 56 allowing access to the interior volume 54 from a position above the interior volume 54 while blocking access to the interior volume 54 from a position below the interior volume 54. The second evacuation position 70 includes the damper arrangement 56 blocking access to the interior volume 54 from a position above the interior volume while allowing access to the interior volume 54 from a position below the interior volume 54.

Still in reference to FIGS. 4-7, in the embodiment illustrated, the enclosure 52 includes a surrounding wall 72 having an open top 74 and an open bottom 76. As mentioned above, the damper arrangement includes at least the top damper 62 and the bottom damper 64. The top damper 62 selectively covers the open top 74 of the surrounding wall 72. The bottom damper 64 selectively covers the open bottom 76 of the surrounding wall 72. The pressure-relief position 66 includes the top damper 62 and the bottom damper 64 being pivoted relative to the surrounding wall 72 to allow airflow through the open top 74 and open bottom 76 of the surrounding wall 72. In FIGS. 5-7, it can be seen that the particular damper arrangement 56 illustrated includes at least three top dampers 62 and at least three bottom dampers 64.

The standby position 58 includes the at least three top dampers 62 closing the open top 74 of the surrounding wall 72 and the at least three bottom dampers 64 closing the open bottom 76 of the surrounding wall 72. In FIGS. 5 and 6, it can be appreciated that the evacuation position 60 includes one of either the first evacuation position 68 and the second evacuation position 70. In the first evacuation position 68, FIG. 5, the at least three top dampers 62 are moved to allow access through the open top 74 of the surrounding wall 72 and the at least three bottom dampers 64 close the open bottom 76 of the surrounding wall 72.

In FIG. 6, the at least three top dampers 62 close the open top 74 of the surrounding wall 72, and the at least three dampers 64 are moved to allow access through the open bottom 76 of the surrounding wall 72.

The pressure-relief position 66, FIG. 7, includes both the at least three top dampers 62 moved to allow access through the open top 74 of the surrounding wall 72, and the at least three bottom dampers 64 moved to allow access through the open bottom 76 of the surrounding wall 72. This pressure-relief position 66 forms an open air flow passageway to allow a continuous stream of airflow through the collection hopper 40 and to the filter arrangement 24.

Still in reference to FIGS. 4-7, the collection hopper 40 illustrated further includes a collection bin 78 oriented below the filter arrangement 24 and above the top damper 62. The collection bin 78 defines an interior 80 in airflow communication with the filter arrangement 24. The top damper 62 is selectively moveable to allow communication between the interior 80 of the collection bin 78 and the interior volume 54 of the container 50. When in the pressure-relief position 66, the damper arrangement 56 is adjusted such that air flow is permitted to flow through the open bottom 76, then through the open top 76, then into the interior 80 of the collection bin 78, and finally to the filter arrangement 24.

FIGS. 8-11 illustrate an example embodiment of the collection hopper 40 illustrated in FIGS. 4-7. The FIG. 8-11 collection hopper 40 illustrates the use of only two top dampers 62 and two bottom dampers 64 (as opposed to the three top dampers and three bottom dampers shown in FIGS. 4-7.) The embodiment of the collection hopper 40 shown in FIGS. 8-11 shows details of one example mechanism for operating the damper arrangement 56 of the hopper 40. In particular, the damper arrangement 56 in the example of FIGS. 8-11 is operated by a pneumatic control system 82. The pneumatic control system 82 includes an upper pneumatic cylinder 84 to control the upper damper 62, and a lower pneumatic cylinder 86 to control the bottom damper 64. Of course, control systems other than pneumatic are usable, including mechanical systems having gears or cams; hydraulic systems; or electrically controlled systems. The pneumatic system 82 is the system illustrated in the FIGS. and is described below, but the other control systems are also usable.

Figure 8:
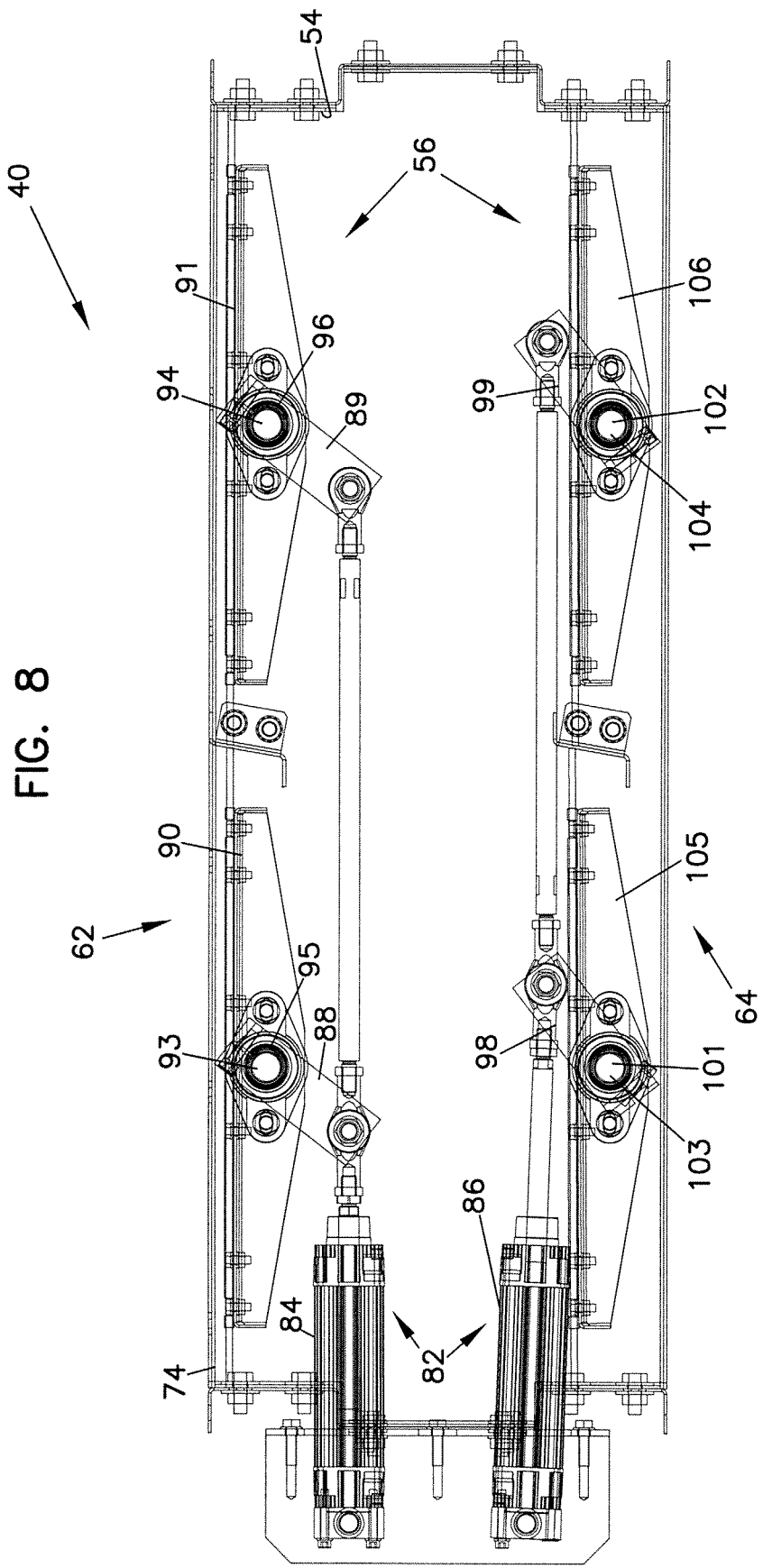
FIG. 8 is an enlarged, schematic, side elevational view of a collection hopper and showing a control system, the collection hopper being depicted in a standby position.
Figure 9:
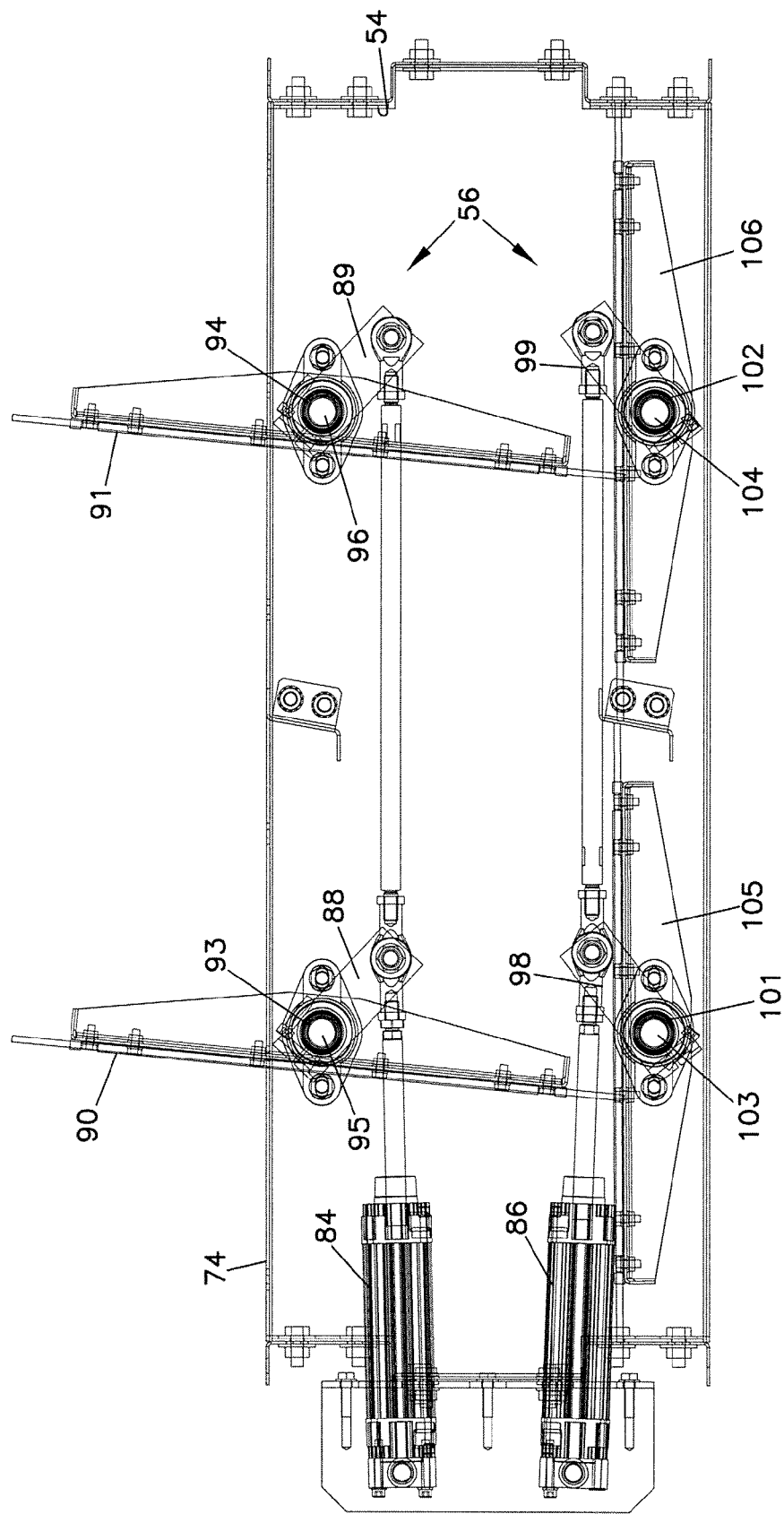
FIG. 9 is the same view of the collection hopper depicted in FIG. 8, and showing the collection hopper in a first position of an evacuation position.

In FIG. 8, the top damper 62 includes first and second links 88, 89 pivotally attached to first and second dampers 90, 91. When the upper pneumatic cylinder 84 is extended from the standby position (FIG. 8) to the first evacuation position 68 (FIG. 9), the first and second dampers 90, 91 pivot about each of its respective axes 93, 94, away from the open top 74. In the embodiment illustrated in FIG. 9, the first and second dampers 90, 91 are pivoted to a position almost 90° from their standby position. In FIG. 9, the position is between 45° and 90°. This allows for dust and debris that has collected in the interior 80 of the collection bin 78 and on top of the first and second dampers 90, 91 to fall by gravity into the interior volume 54. As can be seen in FIGS. 8 and 9, the first and second links 88, 89 connect the upper pneumatic cylinder 84 to the first and second dampers 90, 91 at a hinge 95, 96, in which the first and second axes 93, 94 pass through.

Figure 10:
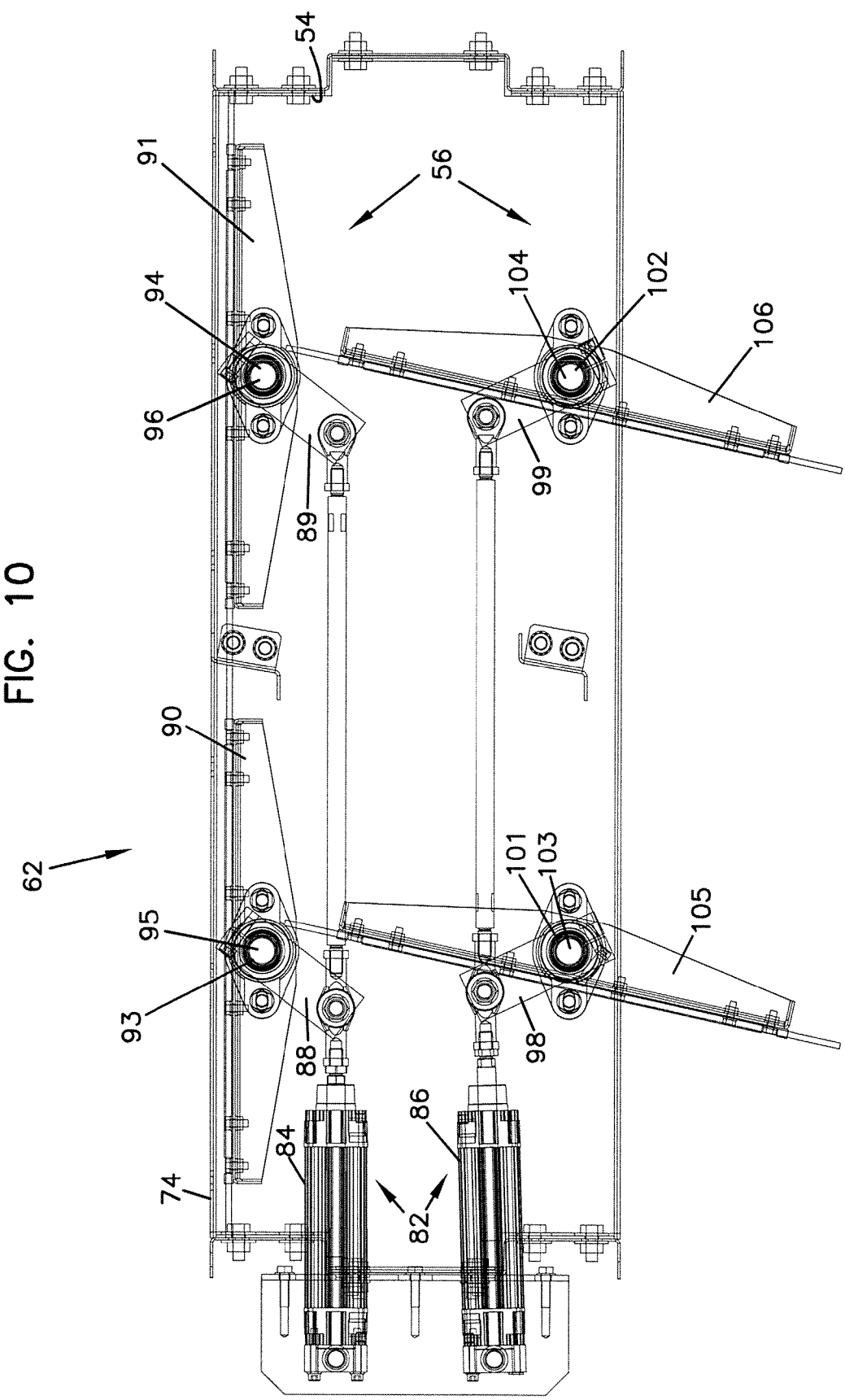
FIG. 10 is the same view of a collection hopper depicted in FIGS. 8 and 9, and showing the collection hopper in a second position of an evacuation position.

FIGS. 8 and 10 illustrate operation of the lower pneumatic cylinder 86. The lower pneumatic cylinder 86 includes first and second links 98, 99. The links 98, 99 pivotally attach to first and second hinges 101, 102. Passing through the first and second hinges 101, 102 are first and second axes 103, 104. The bottom damper 64 includes first damper 105 and second damper 106. In FIG. 8, the lower pneumatic cylinder 86 is in the standby position. In contrast to the upper pneumatic cylinder 84, in the standby position, the lower pneumatic cylinder 86 is extended. To move the bottom damper 64 from the standby position (FIG. 8) to the second evacuation position 70 (FIG. 10), the lower pneumatic cylinder 86 is retracted. When the lower pneumatic cylinder 86 is retracted, the first and second links 98, 99 cause the first and second dampers 105, 106 to pivot about axes 103, 104.

The first and second dampers 105, 106 are then pivoted to a position between 45°-90° relative to their standby position (FIG. 8). This allows dust and debris that has collected within the interior volume 54 to fall by gravity from the interior volume 54 out of the hopper arrangement 40.

Figure 11:
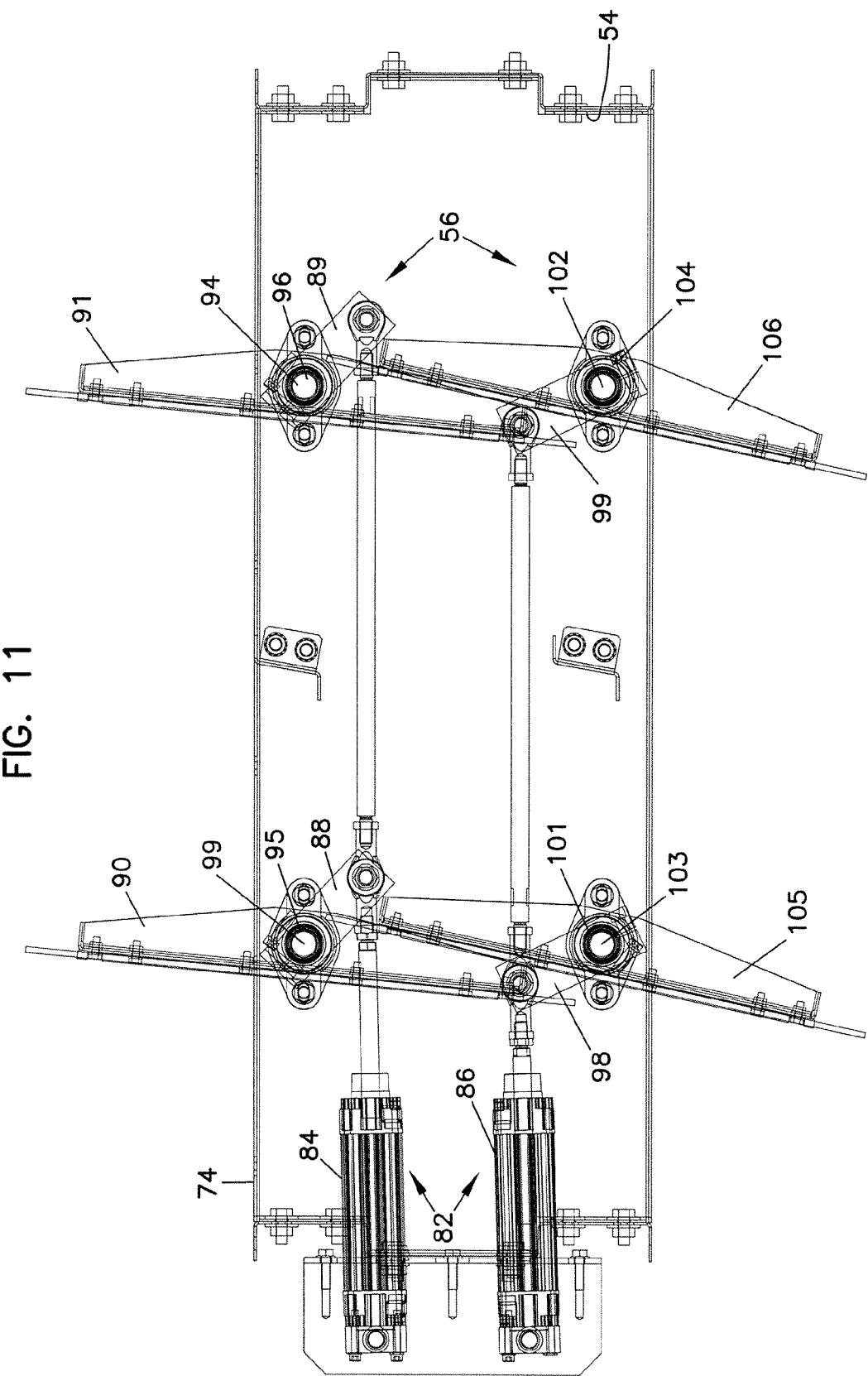
FIG. 11 is a same view of a collection hopper depicted in FIGS. 8-10, and showing the collection hopper in a pressure-relief position.

FIG. 11 shows the hopper arrangement 40 in the pressure-relief position 66. In the position of FIG. 11, the upper pneumatic cylinder 84 is extended, while the lower pneumatic cylinder 86 is retracted. This moves the first and second dampers 90, 91 of the top dampers 62 relative to axes 93, 94, and moves first and second dampers 105, 106 of the bottom dampers 64 relative to axes 103, 104. With each of the dampers 90, 91, 105, 106 pivoted to be between 45° and 90° relative to the standby position, a continuous airflow stream is opened through the hopper arrangement 40. In the embodiment of FIG. 11, the air stream path opened is a straight-line airflow path. In other embodiments, the airflow path could be at an angle, such as 90°, causing air to turn a corner. It should also be appreciated that while the illustrated embodiment shows the dampers at an angle of about 90°, of course, the angle could be substantially less or more than the one shown, depending upon the degree and amount of pressure-relief airflow desired. For example, the damper arrangement 56 could be controlled so that the angle of the damper is relative to the standby position could only be 10°, or 170°, if measuring from the opposite side. In many preferred embodiments, the angle of the dampers when in the pressure-relief position will be between 60°-120°.

Figure 12:
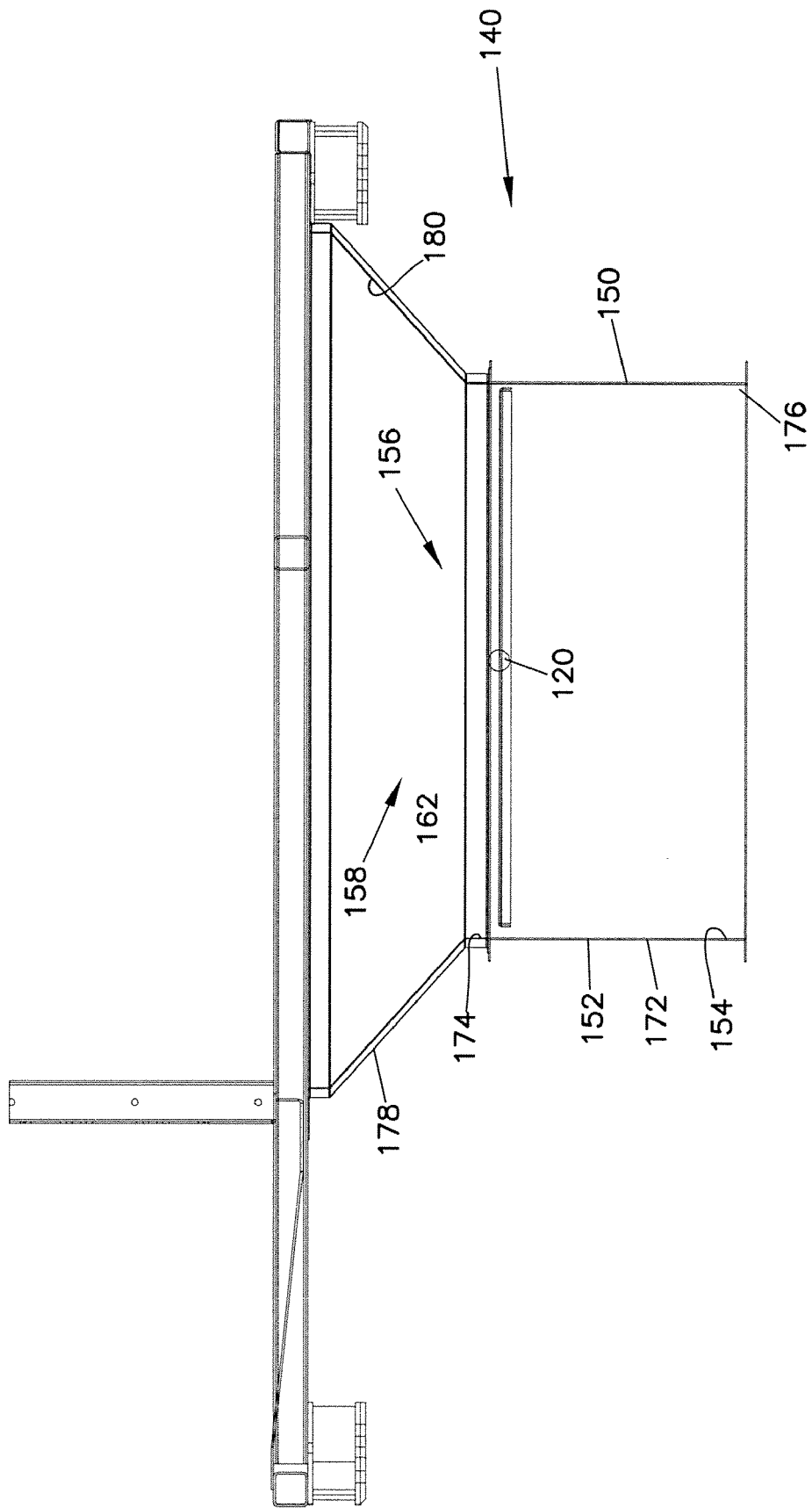
FIG. 12 is a schematic, front elevational view of an alternative embodiment of a collection hopper, the position depicted being in a standby position.
Figure 13:
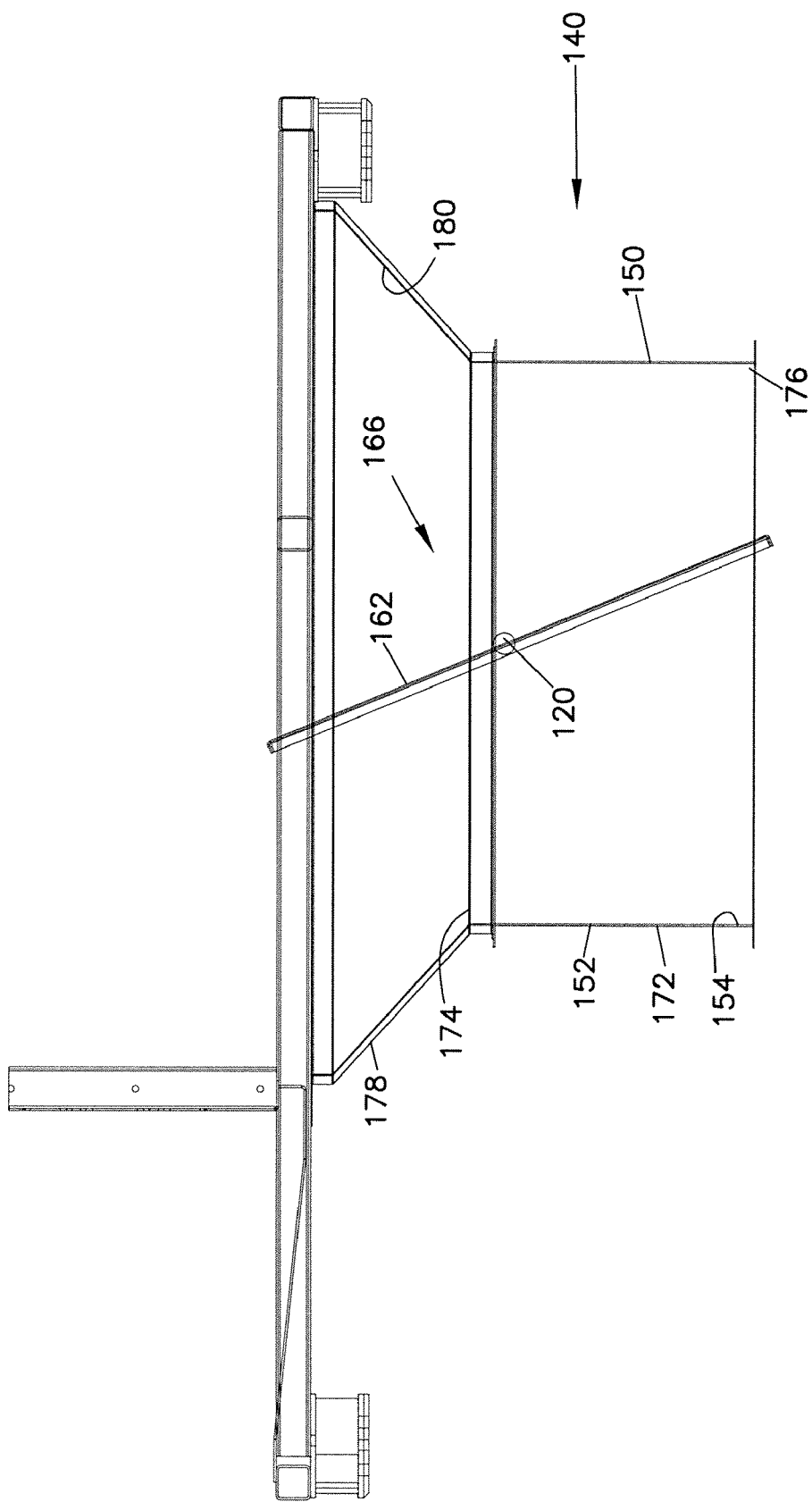
FIG. 13 is the same view of the collection hopper depicted in FIG. 12, and showing the collection hopper in a pressure-relief position.

FIGS. 12 and 13 depict, schematically, another embodiment of a hopper arrangement depicted, generally, at 140. Hopper arrangement 140 includes a damper arrangement 156, a container 150, an enclosure 152, a surrounding wall 172, and an interior volume 154. The surrounding wall 172 has an open top 174 and an open bottom 176. Further, there is a collection bin 178 having an interior 180. In this embodiment, the damper arrangement 156 includes only a single top damper 162. The top damper 162 pivots about pivot axis 120. In the standby position shown at 158 in FIG. 12, the top damper 162 is in a position to close the open top 174, while the open bottom 176 remains open. The top damper 162 is in a position to be generally perpendicular to the surrounding wall 172. In FIG. 13, the top damper 162 is pivoted about the pivot axis 120 to open a continuous airflow passageway through the surrounding wall 172 through the open bottom 176 and through the open top 174 to the interior 180. From there, the airflow reaches the filter arrangement 24. As such, FIG. 13 represents the pressure-relief position 166.

Figure 14:
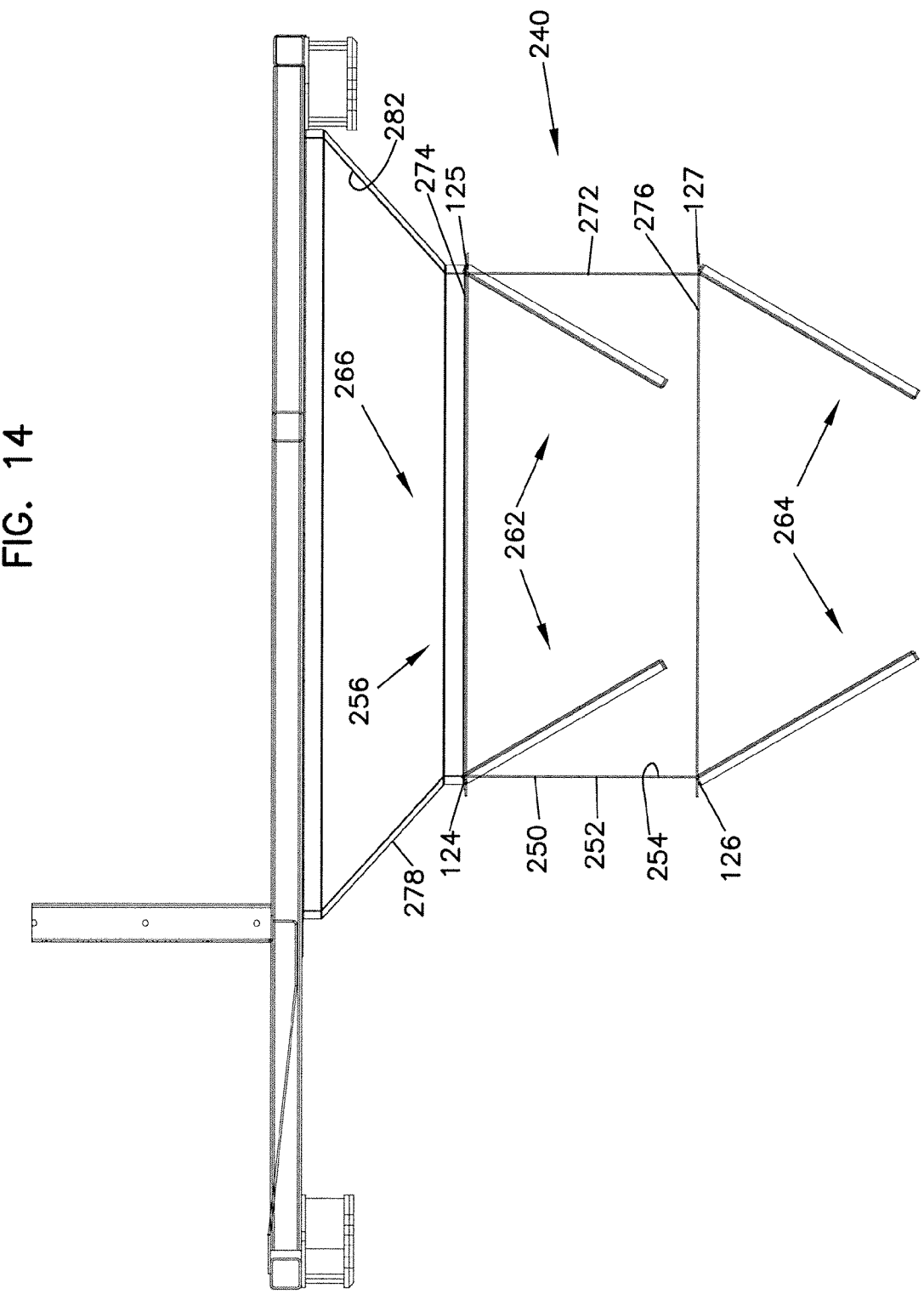
FIG. 14 is a schematic, front elevational view of another embodiment of a collection hopper, and showing the collection hopper in a pressure-relief position.

FIG. 14 depicts another alternative embodiment of a hopper arrangement shown generally at 240. The hopper arrangement 240 includes a collection bin 278, a container 250 including an enclosure 252 with an interior volume 254. The enclosure 252 includes a surrounding wall 272 having an open top 274 and an open bottom 276. There is a damper arrangement 256 to selectively open and close the top 274 and bottom 276 of the enclosure 252. In this embodiment, the damper arrangement 256 includes top dampers 262 and bottom dampers 264.

FIG. 14 depicts the damper arrangement 256 in a pressure-relief position 266. As can be seen in FIG. 14, the top dampers 262 are pivoted relative to the surrounding wall 272 to open the open top 274. The bottom dampers 264 are pivoted relative to the surrounding wall 272 to open the open bottom 276. The dampers have pivot points on the surrounding wall 272. The pivot points are shown at 124, 125, 126, 127. As can be seen in FIG. 14, in the pressure-relief position 266, each of the top dampers 262 is pivoted downwardly. Similarly, each of the bottom dampers 264 is pivoted downwardly. This opens a continuous airflow path through the open bottom 276, into the interior volume 254, through the open top 274, into the interior 282, and up to the filter elements 24. Although not depicted, it should be clear that in the standby position, the hopper arrangement 240 has the same appearance as hopper arrangement 40 in FIG. 4.

FIG. 15 shows another embodiment of a hopper arrangement, shown generally at 340. In this embodiment, the hopper arrangement 340 has a single bottom damper 364. The bottom damper 364 is selectively moveable between the pressure-relief position 366 shown in FIG. 15 and a standby position (not depicted). The pressure-relief position 366 includes the bottom damper 364 pivoted downwardly relative to the surrounding wall 372. The pressure-relief position 366 opens a continuous, straight-line airflow path through the hopper arrangement 340. In the standby position, the bottom damper 364 is positioned to close the open bottom 376 (i.e., the bottom damper 364 is generally perpendicular to the surrounding wall 372.

C. Methods of Use

In operation, the gas turbine intake system 22 operates as follows. Air to be cleaned before entering the gas turbine is drawn through the intake system 22 at arrows 23 (FIG. 2). The air is drawn first through the inlet hood 27 and then through the filter elements 24. The filter elements 24 remove dust and other debris from the air. The cleaned air then proceeds through the outlet side of the system 22 at arrows 28. The cleaned air is then used by a gas turbine for generating power.

Periodically, the filter elements 24 are cleaned by having a pulse of pressurized air blasted through the filter elements 24 from the downstream side to the upstream side. This helps to knock loose any dust or other debris collected on the upstream side of the filter elements 24. The dust and debris falls by gravity into the collection hoppers 40.

Under certain conditions, the inlet hood 27 may become clogged or otherwise occluded. For example, snow or an ice storm may block significant portions of the inlets through the hood 27. In such a condition, it is still desirable to have air reach the filter elements 24. The pressure-relief system, described above, is used. In particular, the collection hopper 40 is adjusted to open a continuous airflow path through the collection hopper 40 in order to reach the filter elements 24. For example, in the arrangement of FIG. 7, the top dampers 62 and bottom dampers 64 pivot relative to the rest of the enclosure 52 in order to open up a straight-line airflow path through the open bottom 76, through the interior 54, through the open top 74, through the interior volume 80, and to the filter elements 24.

The pressure-relief position can be triggered either manually, or automatically based on a predetermined level of measured restriction.

What is claimed is:

1. A hopper arrangement comprising:
   (a) a container including an enclosure and a damper arrangement; the container defining an interior volume;
      (i) the damper arrangement being selectively moveable in at least two positions to manipulate access to the interior volume;
         (A) a standby position wherein the enclosure and damper arrangement block access to the interior volume; and
         (B) a pressure-relief position wherein the interior volume is open to a straight-line air flow through the container.

2. A hopper arrangement according to claim 1 wherein:
(a) the damper arrangement is selectively moveable in at least three positions; a third position including an evacuation position wherein the damper arrangement allows access to the interior volume and blocks a straight-line air flow through the container; and
  (i) the evacuation position includes at least a first evacuation position and a second evacuation position;
    (A) the first evacuation position including the damper arrangement allowing access to the interior volume from a position above the interior volume while blocking access to the interior volume from a position below the interior volume; and
    (B) the second evacuation position including the damper arrangement blocking access to the interior volume from a position above the interior volume while allowing access to the interior volume from a position below the interior volume.

3. A hopper arrangement according to claim 1 wherein:
(a) the enclosure includes a surrounding wall having an open top and an open bottom; and
(b) the damper arrangement includes at least:
  (i) a top damper selectively covering the open top of the surrounding wall; and
  (ii) a bottom damper selectively covering the open bottom of the surrounding wall.

4. A hopper arrangement according to claim 3 wherein:
(a) the pressure-relief position includes the top damper and bottom damper being pivoted relative to the surrounding wall to allow airflow through the open top and open bottom of the surrounding wall.

5. A hopper arrangement according to claim 3 further comprising:
(a) a control system to manipulate the positions of the top damper and bottom damper.

6. A hopper arrangement according to claim 3 wherein:
(a) the damper arrangement includes at least 2 top dampers at least 2 bottom dampers.

7. A hopper arrangement according to claim 6 wherein:
(a) the standby position includes the at least 2 top dampers closing the open top of the surrounding wall and the at least 2 bottom dampers closing the open bottom of the surrounding wall.

8. A hopper arrangement according to claim 7 wherein:
(a) the damper arrangement includes an evacuation position wherein the damper arrangement allows access to the interior volume and blocks a straight-line air flow through the container; and
(b) the evacuation position includes one of:
  (i) the at least 2 top dampers moved to allow access through the open top of the surrounding wall and the at least 2 bottom dampers closing the open bottom of the surrounding wall; and
  (ii) the at least 2 top dampers closing the open top of the surrounding wall and the at least 2 bottom dampers moved to allow access through the open bottom of the surrounding wall;
(c) the pressure-relief position includes both:
  (i) the at least 2 top dampers moved to allow access through the open top of the surrounding wall; and
  (ii) the at least 2 bottom dampers moved to allow access through the open bottom of the surrounding wall.

9. A gas turbine intake system comprising:
(a) a hood;
(b) a filter arrangement downstream of the hood and constructed and arranged to purify air upstream from a gas turbine; and
(c) a collection hopper in airflow communication with an upstream side of the filter arrangement and downstream of the hood; the collection hopper positioned to collect debris caught by the filter arrangement; the collection hopper including at least a standby position and a pressure-relief position;
  (i) the standby position including the collection hopper forming a closed interior volume; and
  (ii) the pressure-relief position including the collection hopper forming an open airflow passageway to allow a continuous stream of airflow through the collection hopper and to the filter arrangement.

10. A gas turbine intake system according to claim 9 wherein:
(a) the collection hopper includes a container including an enclosure and a damper arrangement; the container defining the interior volume;
  (i) the damper arrangement being selectively moveable in at least the standby position, the pressure-relief position, and an evacuation position to manipulate access to the interior volume;
    (A) the standby position includes the enclosure and damper arrangement blocking access to the interior volume;
    (B) the evacuation position includes the damper arrangement allowing access to the interior volume and blocking a continuous stream of air flow through the container; and
    (C) the pressure-relief position includes the interior volume being open to a continuous stream of air flow through the container.

11. A gas turbine intake system according to claim 10 wherein:
(a) the enclosure includes a surrounding wall having an open top and an open bottom;
(b) the damper arrangement includes at least:
  (i) a top damper selectively covering the open top of the surrounding wall; and
  (ii) a bottom damper selectively covering the open bottom of the surrounding wall; and
(c) the collection hopper further includes a collection bin below the filter arrangement and above the top damper; the collection bin defining an interior in airflow communication with the filter arrangement;
  (i) the top damper being selectively moveable to allow communication between the interior of the collection bin and the interior volume of the container.

12. A gas turbine intake system according to claim 11 wherein:
(a) the pressure-relief position includes:
  (i) the top damper being moved to open airflow access through the open top of the surrounding wall;
  (ii) the bottom damper being moved to open airflow access through the open bottom of the surrounding wall; and
  (iii) whereby airflow is permitted to flow through the open bottom, the open top, into the interior of the collection bin and to the filter arrangement.

13. A method of filtering air for a gas turbine system; the method comprising:
(a) drawing air into a hood and then into a filter arrangement;

(b) collecting debris from the filter arrangement into a collection hopper oriented below the filter arrangement; and (c) allowing air to bypass the hood and flow to the filter arrangement through a bypass flow passageway selectively opened by the collection hopper.

14. A method according to claim 13 wherein:

(a) the step of allowing air to bypass the hood includes moving a damper arrangement oriented relative to a surrounding wall of the collection hopper to create a continuous flow passageway through the collection hopper.

15. A method according to claim 14 wherein:

(a) the step of collecting debris includes allowing debris to fall by gravity from the filter arrangement into the collection hopper; the collection hopper being closed to airflow therethrough.

16. A method according to claim 15 further comprising:

(a) before the step of allowing air to bypass the hood, moving the damper arrangement to evacuate debris from, first, a collection bin in the collection hopper, and second, an interior volume within the surrounding wall;
  (i) the step of moving the damper arrangement to evacuate debris includes blocking a continuous stream of airflow through the collection hopper.

17. A method according to claim 14 wherein:

(a) the step of allowing air to bypass the hood including moving a damper arrangement oriented relative to a surrounding wall of the collection hopper to create a continuous flow passageway through the collection hopper, includes pivoting a top damper and a bottom damper relative to the surrounding wall to create a continuous flow passageway through a bottom opening of the surrounding wall and through a top opening of the surrounding wall.

18. A gas turbine intake system comprising:

(a) a filter arrangement constructed and arranged to purify air upstream from a gas turbine; and (b) a collection hopper comprising a container including an enclosure and a damper arrangement; the container defining an interior volume;
  (i) the damper arrangement being selectively moveable in at least three positions to manipulate access to the interior volume;
    (A) a standby position wherein the enclosure and damper arrangement block access to the interior volume;
    (B) an evacuation position wherein the damper arrangement allows access to the interior volume and blocks a straight-line air flow through the container; and
    (C) a pressure-relief position wherein the interior volume is open to a straight-line air flow through the container;
  (ii) the enclosure including a surrounding wall having an open top and an open bottom;
  (iii) the damper arrangement including at least:
    (A) a top damper selectively covering the open top of the surrounding wall; and
    (B) a bottom damper selectively covering the open bottom of the surrounding wall; and
  (iv) the pressure-relief position including the top damper and bottom damper being pivoted relative to the surrounding wall to allow airflow through the open top and open bottom of the surrounding wall.

\* \* \* \* \*